United States Patent [19]

Tsuchiya

[11] Patent Number: 5,345,582
[45] Date of Patent: Sep. 6, 1994

[54] FAILURE DETECTION FOR INSTRUCTION PROCESSOR ASSOCIATIVE CACHE MEMORIES

[75] Inventor: Kenichi Tsuchiya, New Brighton, Minn.

[73] Assignee: Unisys Corporation, Blue Bell, Pa.

[21] Appl. No.: 811,123

[22] Filed: Dec. 20, 1991

[51] Int. Cl.$^5$ ............................................ G06F 11/10
[52] U.S. Cl. ................................. 395/575; 395/400; 395/425; 371/51.1
[58] Field of Search ....................... 371/51.1, 2.2, 5.4, 371/10.1, 11.1, 12, 13, 19, 21.1, 68.3; 395/400, 425, 575

[56] References Cited

U.S. PATENT DOCUMENTS

| | | | |
|---|---|---|---|
| 3,585,378 | 5/1971 | Bouricius | 371/10.1 |
| 3,789,204 | 1/1974 | Barlow | 235/153 |
| 3,967,247 | 6/1976 | Andersen et al. | 340/172.5 |
| 4,010,450 | 3/1977 | Porter et al. | 371/10.1 |
| 4,168,541 | 9/1979 | DeKarske | 365/230 |
| 4,322,795 | 3/1982 | Lange et al. | 364/200 |
| 4,335,458 | 5/1982 | Krol | 371/38.1 |
| 4,493,026 | 1/1985 | Olnowich | 364/200 |
| 4,641,305 | 2/1987 | Joyce et al. | 371/12 |
| 5,210,845 | 5/1993 | Crawford et al. | 395/425 |

OTHER PUBLICATIONS

Smith, Allen J., "Cache Memories," Association for Computing Machinery (ACM), Computing Surveys, vol. 14, No. 3, Sep., 1982, pp. 473–530.

*Primary Examiner*—Robert W. Beausoliel, Jr.
*Assistant Examiner*—Dieu-Minh Le
*Attorney, Agent, or Firm*—Glenn W. Bowen; Charles A. Johnson; Mark T. Starr

[57] ABSTRACT

A system for detecting failures in a cache memory stores data words that may represent instructions or operands in plurality of blocks. The data words are divided into a plurality of data bit groups. A tag memory is associated with each block of data words in the cache memory. Storage in the cache memory is directed by block address bits, and storage in the tag memory is directed by tag address bits. A first parity generator is coupled to the cache memory which generates address parity bits selected from block and tag address bits. A second parity generator provides data parity bits for each group of the data word bits. These two parity bits are combined and are stored along with the bit groups of the associated data word. Upon read-out of a data word, the stored combined parity bits are compared with parity bits that were generated from the selected address bits and data bits and error indication occurs when a parity error results.

2 Claims, 3 Drawing Sheets

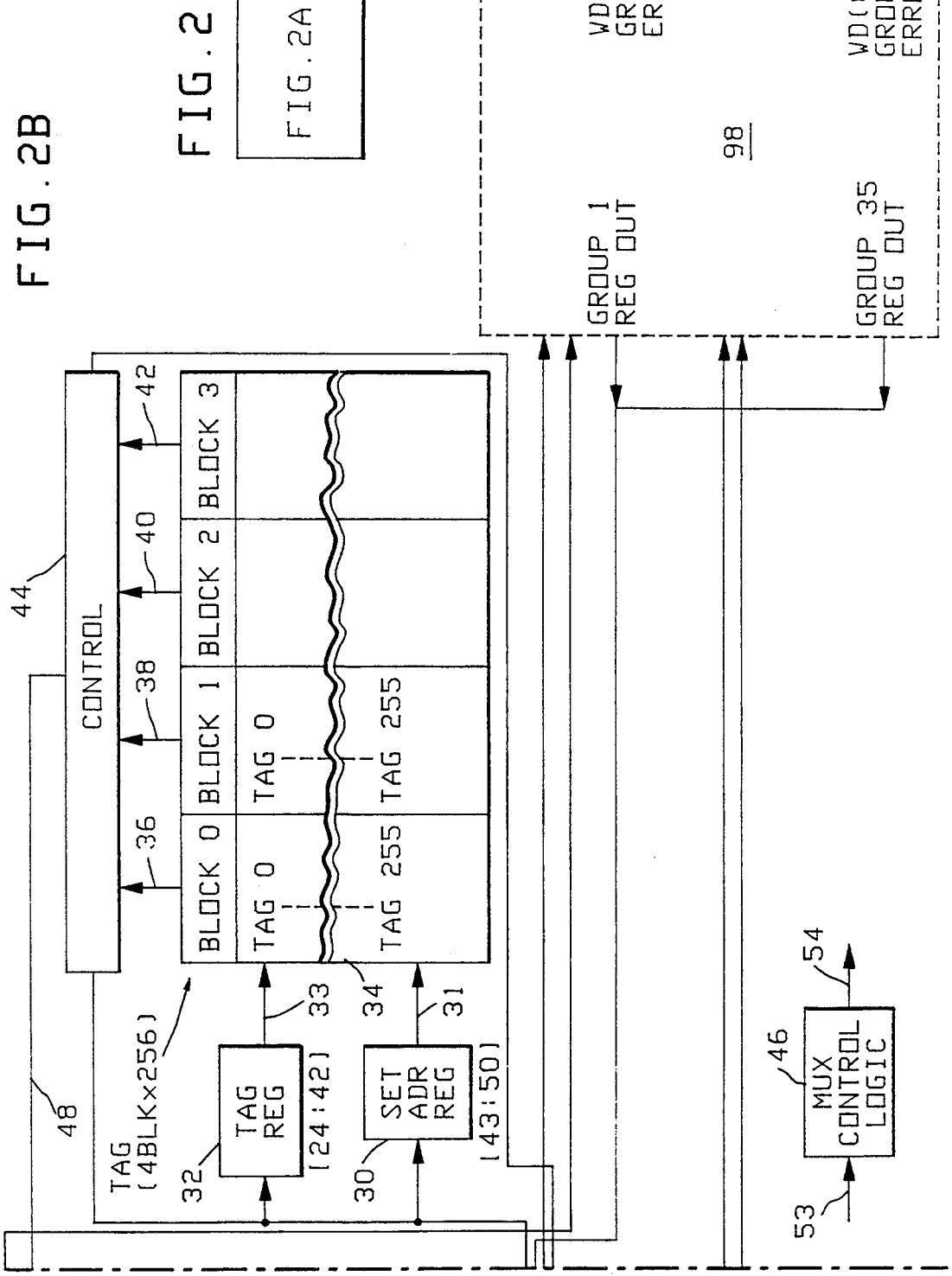

FAILURE DETECTION FOR INSTRUCTION PROCESSOR ASSOCIATIVE CACHE MEMORIES

BACKGROUND OF THE INVENTION

1. Field of the Invention

This invention relates to the detection of errors in c he memories, and more specifically to the detection of errors in instruction processor cache memories which hold operands wherein predefined bits of the operand are designated to provide block and cache array addresses.

2. Discussion of Background Art

Cache memories are used in conjunction with the instruction processors of computers to temporarily hold portions of main memory contents which are in use, or have been used relatively recently. In the instruction processor of such computer systems, cache memories may be used to store operands. The advantage of a cache memory is that data in it can be accessed in a small fraction of the time that is required to access the main memory. Therefore, if the cache contents, such as an operand, have been used relatively recently, the operand can be obtained from the cache memory without a time-consuming reference to the main memory. Whereas main memory access time has held relatively constant at 300 to 600 nanoseconds in recent years, information can be obtained from a cache memory in as short a time period as 10 nanoseconds with current technology.

The operation of cache memories and their advantages are well known. A comprehensive overall survey of cache memories appears in the article entitle "Cache Memories" by Allen J. Smith and published by the Association for Computing Machinery (ACM) in Computing Surveys, Vol. 14, No. 3, September 1982, pp. 473-530.

Cache memories are often organized into a number of blocks each of which have a fixed set of words associated therewith. The organization of cache buffers into blocks is shown in U.S. Pat. No. 3,967,247, issued Jun. 29, 1976 to Vernon K. Anderson and Michael W. Goddard, and in U.S. Pat. No. 4,168,541, issued Sep. 18, 1979 to Clarence W. Dekarske. Both of the patents are assigned to the predecessor of the assignee of the present invention. A variation of this type of cache memory is provided by dividing each block into even word and odd word sections and by interleaving access of even and odd words alternately.

As shown in the Dekarske patent, a tag buffer may be associated with the cache memory which is also divided into a number of blocks. The tag cache holds tags which represent a portion of the memory address bits of the words which are currently held in the cache memory. When a match is achieved between a tag and the address that is supplied to the cache memory, the appropriate word is selected from the block of the cache memory that provided the matching tag.

U.S. Pat. No. 3,789,204 entitled "Self Checking Digital Storage System" which issued Jan. 29, 1974 to George Joseph Barlow discloses a system and a method for detecting faults within a self-checking digital storage system with capabilities of generating a data parity bit indicative of the data parity to be stored in the digital storage system, generating a first address parity bit indicative of the address parity where the data is to be stored, forming of a combined parity bit from the data parity and the address parity bit, storing the combined parity bit and the data in a selected location addressed by the address, accessing the combined parity bit along with the data whenever the data is read out of the digital storage system. Barlow also discloses a generating of a second address parity bit for the address utilized to effect the read out of the data and the combined parity bit, a forming of a reconstructed parity bit, and a comparing of the reconstructed parity bit with a parity bit of the data output.

The method and system of the Barlow patent, however, do not teach the implementation of a failure detection system or method for set associative cache memories which are divided into a number of blocks that are grouped into even and odd sets of words, and the memory is addressed through block and tag address bits. Further, the Barlow method will create problems for a large system at the system initialization since data in RAMs must be parity correct at all times. Therefore, the RAMs must be written at the system initialization by being scanned in or written in via a special hardware.

The present invention is implemented as a set associative manner wherein the memory is divided into a number of blocks which are subdivided into even and odd words that are grouped in a number of sets of words and the memory is addressed through block and tag address groups. An example of a prior set associative cache memory and its operation is found in U.S. Pat. No. 4,945,512 entitled "High-Speed Partitioned Set Associative Cache Memory," issued Jul. 31, 1990 to Clarence W. Dekarske et al. and assigned to the assignee of the present invention.

SUMMARY OF THE INVENTION

Failure detection is provided for in a cache memory which stores multiple bit input data words in a plurality of blocks. The cache memory is operatively associated with a tag memory that stores a portion of the memory address bits of the data words that are currently stored in said cache memory. A multiplexor is coupled to the tag and cache memories to control read from and writing into the cache memory. Storage in the cache memory is directed by memory address bits, and storage in the tag memory is directed by multiple tag address bits. Upon writing into the cache memory, a plurality of address parity bits are generated from the cache memory address bits and the associated tag address bits for each address that is selected. A data parity bit is also generated from the input data word bits for each of a number of groups of data word bits, and these are stored in the cache memory. The combined parity bits are stored with the groups of data word bits from which the parity bits were derived. Upon selection of an address to be read from in the cache memory, the address and data parity bits for the selected memory address are generated and combined in the described manner, and are compared with the stored parity bits that were accessed upon read-out from the selected address of the cache memory, and parity errors are generated when parity bit comparisons fail only when a read referenced block is resident in the cache, indicated by 'BLOCK HIT' condition.

Since a large computer system employs a simple master-clearable memory for its cache block validity designation, cache's memories need not be initialized because data blocks in the cache will not be valid until blocks are written into the cache memories at least once.

Therefore, 'BLOCK HIT' condition will not be active until data block is written into the cache memory.

BRIEF DESCRIPTION OF THE DRAWINGS

FIG. 1b is a diagrammatic representation of the parity grouping of the addressing bits of FIG. 1a.

FIG. 2 shows how FIGS. 2a and 2b are aligned.

FIGS. 2a and 2b are a block diagram illustration of the cache data protection system of the present invention which is applied to a 4-block cache that employs even and odd word organization in conjunction with a 4-block tag buffer.

DETAILED DESCRIPTION OF THE INVENTION

Figure 1A:
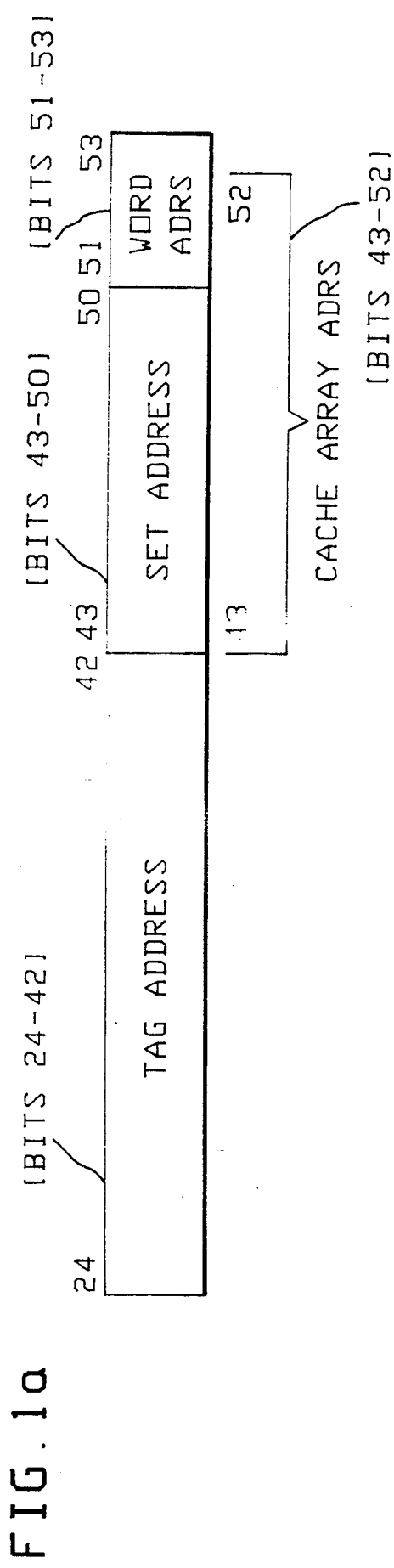
FIG. 1a is a bit map which illustrates the bits utilized to address the cache and tag memories of the present invention.

Referring to FIG. 1a, the address bits for addressing an operand cache memory include bits 24-52 of the address word. The tag address is represented by bits 24-42 while the set address is represented by bits 43-50 (as noted in the block below the tag address register 30 in FIG. 2b). The cache address register addresses the cache memory 10 via the lines 27.

Because 8 bits, bits 43-50, are used in the set address, 256 address locations may be utilized for storing a tag entry in the set associative cache memory of the illustrated embodiment. Bit 53 allows for selection between even and odd words. Thus, the cache memory may store 256 sets of words in which there are four words per set. Bits 51 and 52 are used to specify the words within a set. For example, in set 0, block 0, the even numbered words will be 0, 2, 4 and 6. Thus, for the words 0-3 in a set, the odd numbered words in each block will be 1, 3, 5 and 7.

Figure 1B:
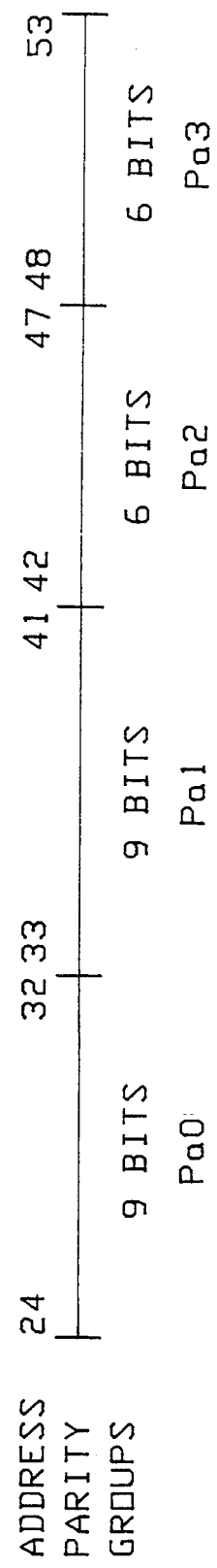

As shown in FIG. 1b, the addressing bits for the cache memory may be grouped in a logical manner to provide four address parity bits Pa0-Pa3. A parity grouping can be any number of bits. In the illustrated embodiment the bit grouping is 9, 9, 6, 6. Bits 24 to 32 may be used to provide the address parity bit Pa0, bits 33 to 41 to provide the parity bit Pa1, bits 42-47 to provide the address parity bit Pa2 and the bits 48-53 to provide the address parity bit Pa3.

Figure 2A:
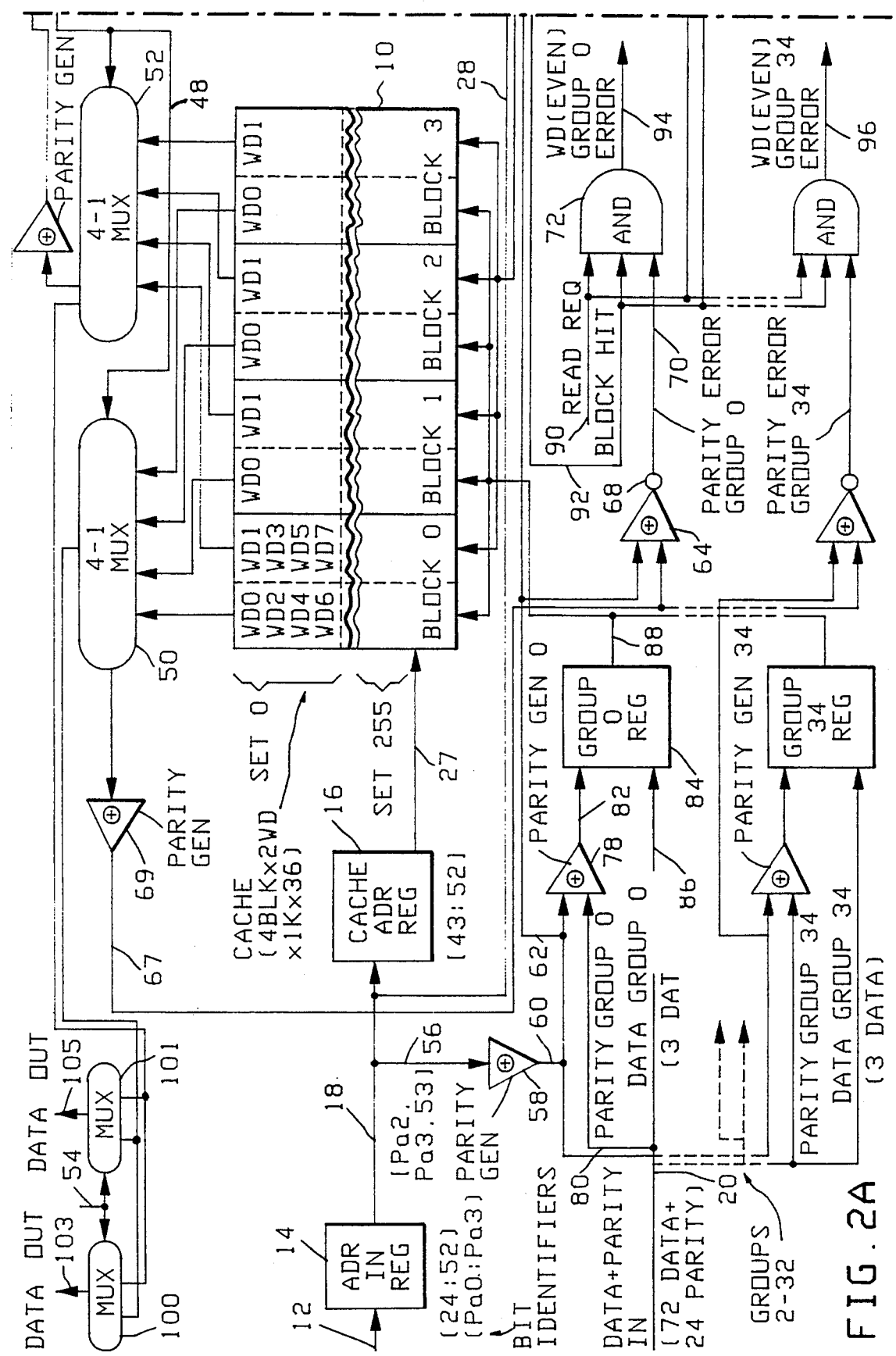

By reference to the block diagram of FIGS. 2a and 2b, it is seen that the cache memory 10 used in the illustrated embodiment of this invention stores 4 blocks that are numbered 0-3 and that each block is divided into even and odd word sets. Address bits 24-53 are supplied on the incoming address bus 12 by a requesting processor (not shown) to the address input register 14. Along with these 30 addressing bits there are the 4 address parity bits Pa0-Pa3 described above. The bits 43-52 of these address bits are supplied to the cache memory 10 on the lines 18 through the cache address register 16. Single line showings in the drawings represent the number of lines that are necessary to transfer the required number of bits, and the term "line" in the specification, therefore, also represents the required number of lines. The bits 24-42 are used to identify block addresses (as noted in the brackets below the address in the register 14 block in FIG. 2a and the write register 32 block in FIG. 2b) while the cache array address is determined by the bits 43-52 (as noted in the brackets below the cache address register 16 block in FIG. 2a). These 10 bits provide the capability of addressing 1024 locations so that each of the words 0, 2, 4 and 6 of the even word sets will be addressed simultaneously with the words 1, 3, 5 and 7 of the corresponding odd word set at the same address of any one of the 256 sets that comprise each block.

The broken lines in the illustration of cache memory 10 in FIG. 2a represent the portion of the cache memory that stores the 256 even and odd sets of 4 words each that lie between set 0 and set 255 to economize on drawing size.

In the described embodiment, the input operand data and data parity bits are received on lines 20. The data, instruction operand, contains 36 bits for each of two operand words. Therefore, there will be a total of 72 data bits for the combined even and odd addresses. The data bits are grouped into groups of 3, and each group of 3 data bits is subjected to parity generation prior to reaching the input lines 20. Therefore, each group of 3 data bits will provide 1 data parity bit on the lines 20 for a total of 24 data parity bits. When a "write" instruction is executed, the 72 data bits received on lines 20 are written into two of the 36-bit operand words that are stored in the cache through the group registers, such as the group register 84.

The address input register 14 supplies the bits 43-50 on the lines 28 to the tag address register 30 and the bits 24-42 to the write register 32. The bits 43-50 allow 256 tags to be selected via lines 31 in the tag memory 34, which is a 4-block 256 tag memory. The tags are formed of bits 24-42 written to the appropriate location via lines 33 from the write register 32. The data corresponding to block address bits 24-42 are stored in the cache memory 10. The illustration of tag memory 34 in FIG. 2b has a broken middle section of the tag memory 34 which omits showing the portion of the tag memory where tags 0-255 are stored to economize on drawing size.

When a particular operand is to be used, it is first necessary to determine if the operand is resident in the cache memory. To accomplish this determination, the tag address bits 24-42 for the operand is supplied to the tag address register 30 via lines 31. The blocks 0-3 are simultaneously read out on the lines 36, 38, 40 and 42 to the control 44. The control 44 determines if the currently requested addresses match the addresses represented by the tag bits 24-42 that have been read out from the tag memory 34.

If a match occurs for any of the tags sent on the lines 36, 38, 40, 42, a Block Select signal will be sent on the lines 48 to one of the 4-to-1 multiplexors 50 or 52, and a block selection will be made. The multiplexors 50, 52 are capable of respectively supplying even or odd output words of selected blocks. The multiplexors 100 and 101 are provided to align output data based on control signals received on the line 53, such as, for example, the read requested address bit 53, or a double word request signal, or a data swapping condition signal, via multiplexor control logic 46 which supplies control signals to these multiplexors on the line 54. The data out is supplied on the lines 103, 105, respectively.

For the purposes of the following description, it is assumed an even word has been selected. The operation of the circuit will be the same when the odd word is selected except that the multiplexor 52 and the odd word logic will be operational instead of the even word logic and the multiplexor 50.

The parity bits Pa2 and Pa3, along with an even/odd bit 53, are sent on the lines 56 to a parity generator 58 which may be an exclusive-OR gate. (In the drawings the single line 56 represents the 3 lines necessary to carry the 2 parity bits Pa2 and Pa3 and bit 53 to the parity generator 58.) The output of the parity generator 58 on the line 60 is representative of a parity bit formed from the 2 parity bits Pa2 and Pa3. The parity generator 58 may be an even parity generator. Then if the parity produced by bits Pa2 and Pa3 are the same, even parity will be provided at the output on the line 60 regardless of the state of bit 53. (Parity bits Pa0 through Pa3 could alternately be used. The parity generator 58 could be an odd parity generator, if desired.)

The parity signal on the line 60 is supplied on line 62 to one input of the parity generator 64. Another input to the parity generator 64 is supplied on the output line 67 from the parity generator 69 that is coupled to receive the output data from the memory which is supplied through the multiplexor 50. These two input signals generate an output which is inverted (as indicated by the circle 68 on the output of the parity generator 64), and is supplied on the line 70 to the AND gate 72. The input to the parity generator on the line 67 from multiplexor 50 consists of 3 data bits of the selected input word which in the illustrated embodiment are the 3 most significant bits (i.e., group 0).

Parity is also generated for the parity signal on the line 60 and the data group 0 bits on the lines 80. This group's corresponding data parity bit is supplied by parity generator 78 on the line 82 to the group 0 register 84. 3 data bits for group 0 are also supplied on the lines 86 to the register 84. The output of the group 0 register 84 is supplied on the lines 88 and is used to provide 3 data bits and corresponding address parity bit for storage in the cache memory 10 at the specified address.

The lines between the group 0 components and the group 34 components in FIG. 2a are shown in dotted line form to represent the even groups 2–32 which are omitted to conserve drawing space. The components used in the even groups 2–32 are identical to the components 78, 84, 64 and 72. Similarly, although components are only shown for even groups 0 and 34, the odd group logic in the odd group logic section 98 is also implemented with identical components.

Errors may be detected upon read-out when the executive control system (not shown) issues a read request signal on the line 90 to the AND gate 72 simultaneously with the issuance of a block select signal and/or block hit signal from the control 44 on the line 92. An even word group 0 error (which is designated as WD[EVEN] in FIG. 2a) is indicated on the line 94 if a parity group 0 error appears on the line 70 when the read request and block hit signals are present. If the error is a permanent one, the offending portion of the attached memory may be degraded by using techniques known in the art so that it will not be used again.

Thus each of the groups, such as the group 34 for example, can provide a group error signal on the corresponding line, such as the line 96 which represents group error WD[EVEN] for group 34 of an even word. The logic 98 is provided with identical circuitry to allow odd data words to be subdivided into the 3-bit segments so that each of the 3-bit groups of odd words may be checked for errors in the same manner as described for even data words. It is obvious that this design lends to a failing chip detection implementation also.

While a particular embodiment of the present invention has been described, the invention encompasses various alternative versions in which different bit groupings, different parity bit combinations and different odd and even parity schemes may be utilized within the scope of the present invention.

What is claimed is:

1. A method of detecting failures in a cache memory which stores multiple bit input data words in groups of data bits organized into a plurality of blocks which are operatively associated with a tag memory and which stores a tag portion of memory address bits that corresponds to each block of the data words that are currently stored in said cache memory, wherein a multiplexor means is coupled to said tag and cache memories for controlling the reading from, and the writing into, said cache memory in accordance with tag address bits that are stored in said tag memory, data word storage in said cache memory is directed by block address bits, and tag bit storage in said tag memory is directed by tag address bits comprising the steps of:

(a) generating, upon writing into said cache memory a plurality of address parity bits from a plurality of said memory address bits selected from the block address bit groups and the tag address bit groups that are associated with each address that is selected, (b) generating at least one data parity bit for each group of data bits of said multiple bit input data words, (c) forming a combined parity bit for each of said groups of data bits and at least one of said address parity bits, (d) storing said combined parity bits in the blocks in said cache memory that are associated with the groups of said data bits from which said parity bits were derived, (e) storing said group of data bits along with the associated combined parity bits in said cache memory, (f) determining if said tag address bits represent a set of words that are stored in said cache memory, and then only if they do represent such a set of words:

(1) reading a data word from said cache memory at a selected read address, (2) generating at least one said address parity bit from the cache and tag address bits that are associated with each group of data bits read from the selected read address, (3) comparing a combined parity bit of the selected read address and the data bits read out to the combined stored parity bit that was generated upon read out of a stored group of data bits which corresponded to the address selected for readout, and (4) generating indications of parity errors when such comparison indicates that such errors have occurred.

2. A failure detection system for detecting failures in a cache memory which stores multiple bit input data words in location in a plurality of blocks that are specified by memory address bits, and which is operatively associated with a tag memory which stores a portion of said memory address bits of said data words that are currently retained in said cache memory, comprising:

control means coupled to said tag memory and to said cache memory for controlling the reading of bits from, and the writing of bits into, said cache memory in accordance with bits stored in said tag memory, (a) first means coupled to said cache memory for generating upon writing into said cache memory at least one address parity bit selected from at least one of the block address bit groups and one of the tag address bit groups that are associated with each address that is selected, (b) second means coupled to said control means for generating at least one data parity bit from said multiple bit input data words for each group of data bits that are stored in each of said blocks, (c) third means for combining said parity bits from each of group of data bits with the parity bit that is derived from the address bits that are associated with the same group of data bits, (d) fourth means for storing said combined parity bits in the blocks that are associated with the groups of data word bits from which said parity bits were derived, (e) fifth means for storing said data bits along with the associated combined parity bits, (f) sixth means for determining if said tag address bit represents a block stored in said cache memory, (g) seventh means for generating, upon reading from said cache memory, said at least one address parity bit for each set of cache and tag address bits for each selected address to provide corresponding address parity bits, (h) eighth means for comparing each read-out group of data bits and associated stored combined parity bits with the associated one of said address parity bits that were generated upon read out of the associated store group of data bits and the corresponding combined parity bit from said cache memory, and (i) ninth means for receiving said corresponding address parity bits and said corresponding combined parity bit and for generating an indication of a parity error when one occurs in any of said groups of data bits only if said tag address bits are determined by said sixth means to represent a block stored in said cache memory.

* * * * *